June 28, 1938.  D. H. STEWART  2,121,838
SOUND OPERATED DICE MACHINE
Filed July 1, 1937   7 Sheets-Sheet 1

David H. Stewart,
INVENTOR.
BY Ralph Donath
ATTORNEY.

June 28, 1938.  D. H. STEWART  2,121,838
SOUND OPERATED DICE MACHINE
Filed July 1, 1937  7 Sheets-Sheet 2
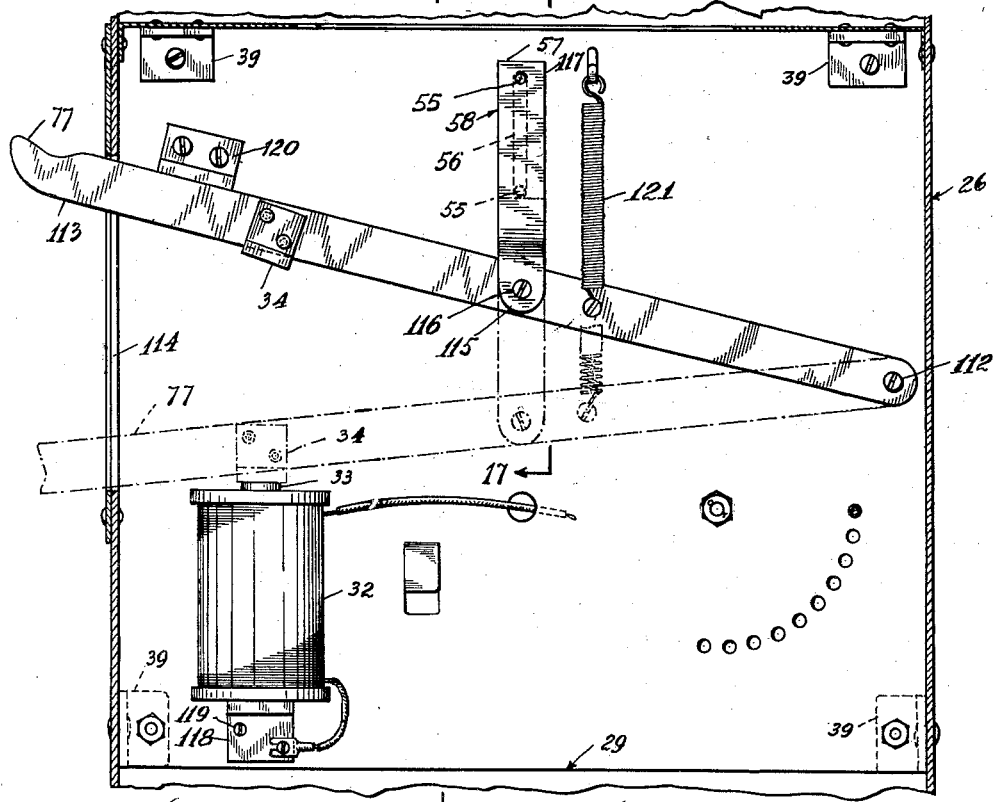
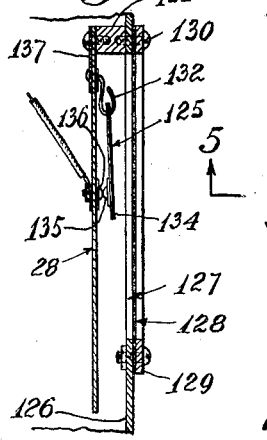
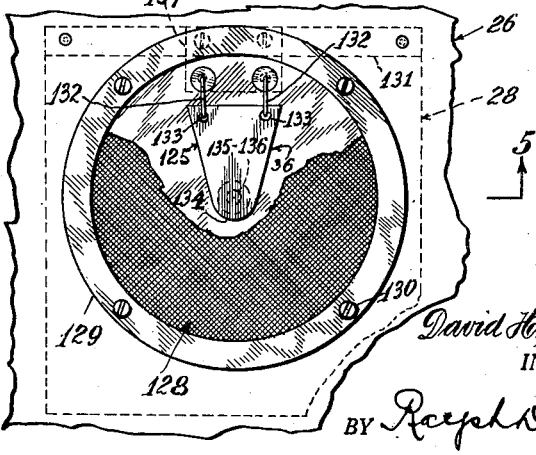
David H. Stewart,
INVENTOR.
BY Ralph Donath
ATTORNEY.

June 28, 1938. D. H. STEWART 2,121,838
SOUND OPERATED DICE MACHINE
Filed July 1, 1937 7 Sheets-Sheet 3
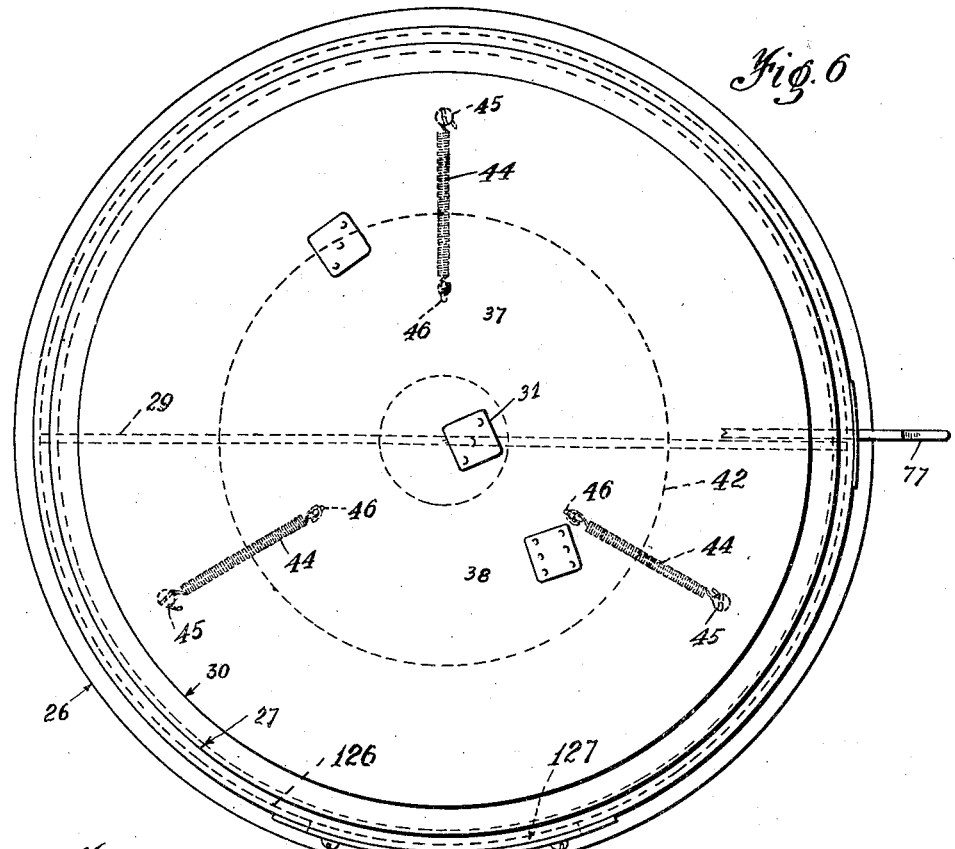
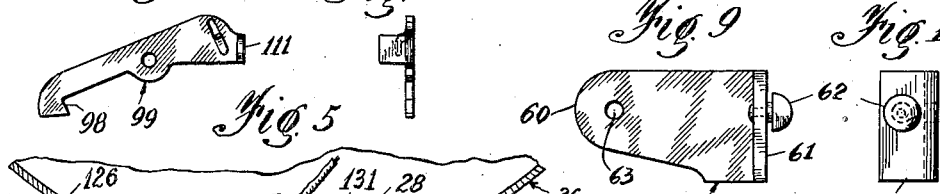
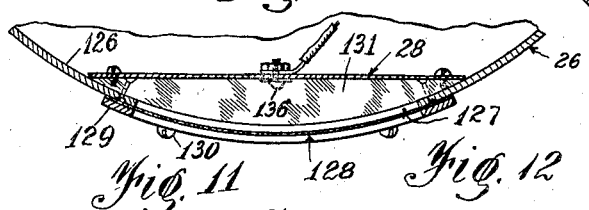
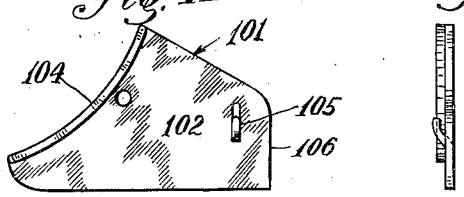
David H. Stewart,
INVENTOR.
BY Ralph Wannath
ATTORNEY.

June 28, 1938.  D. H. STEWART  2,121,838
SOUND OPERATED DICE MACHINE
Filed July 1, 1937　　7 Sheets-Sheet 4

David H. Stewart,
INVENTOR.
BY Ralph Donath
ATTORNEY.

June 28, 1938.  D. H. STEWART  2,121,838
SOUND OPERATED DICE MACHINE
Filed July 1, 1937  7 Sheets-Sheet 5
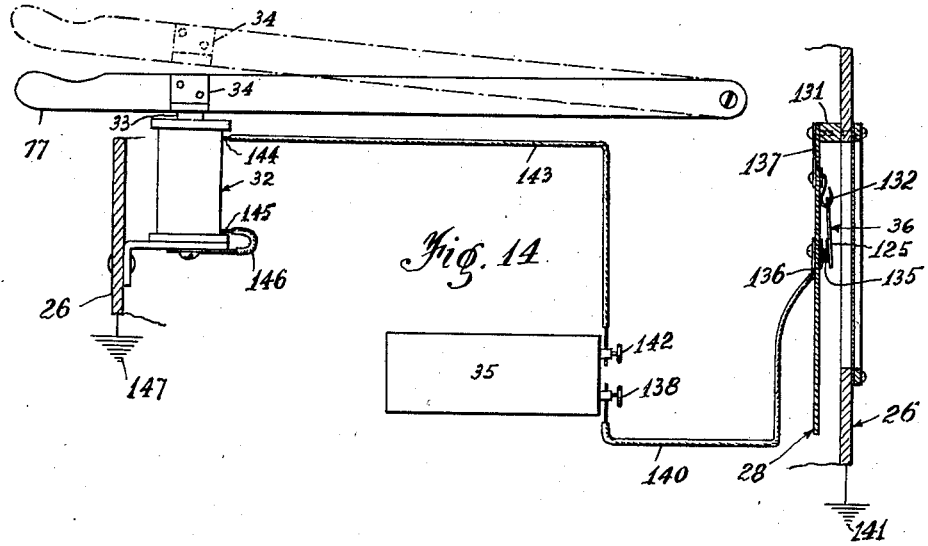
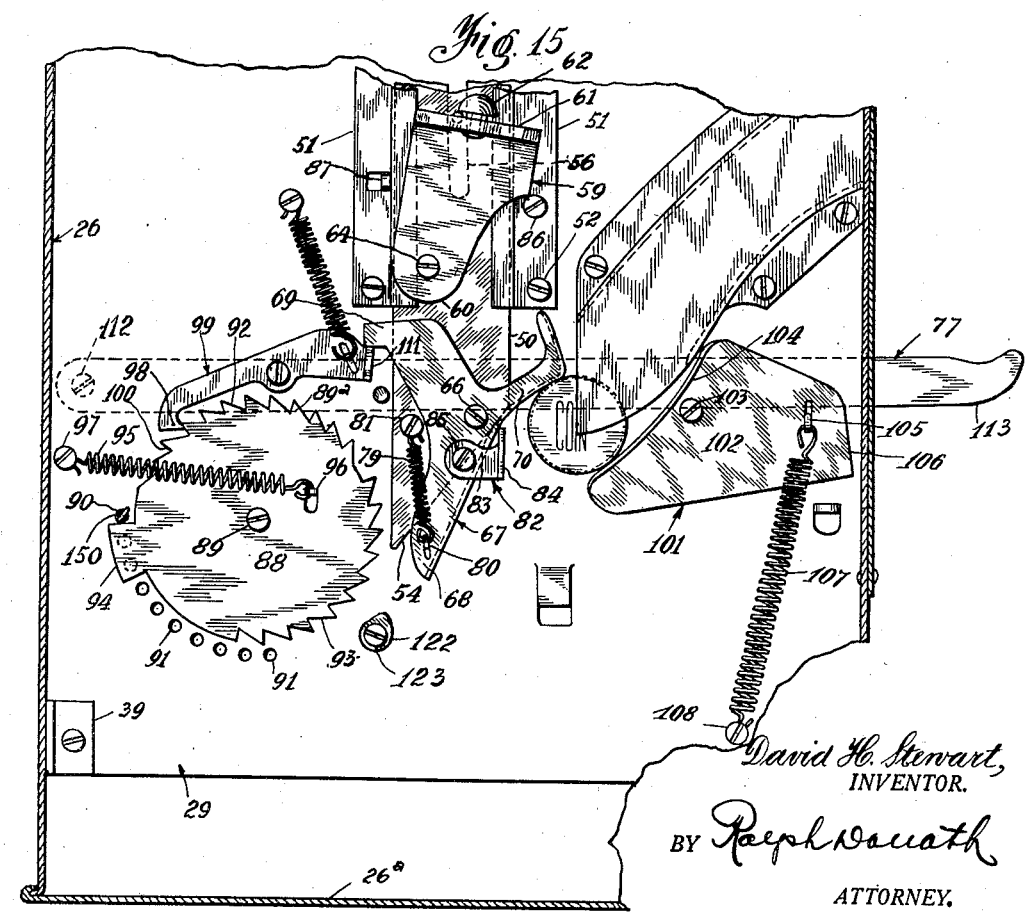
David H. Stewart,
INVENTOR.
BY Ralph Donath
ATTORNEY.

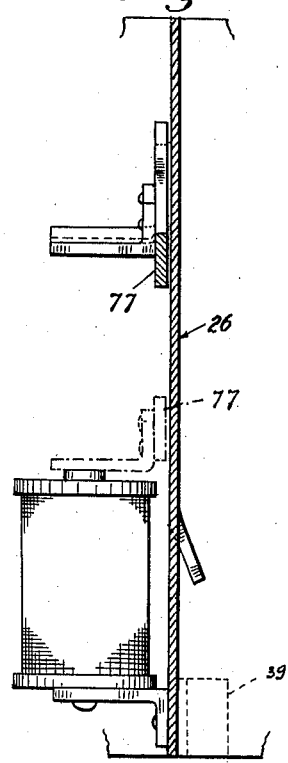
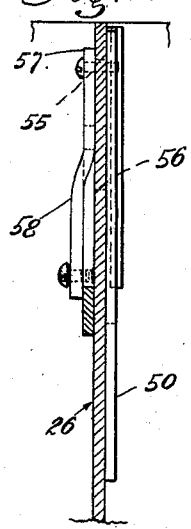
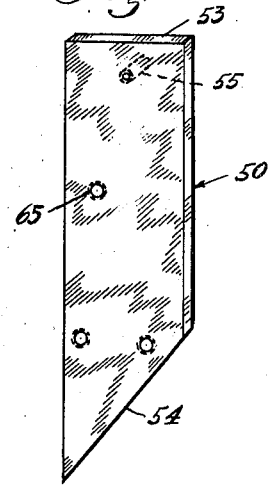
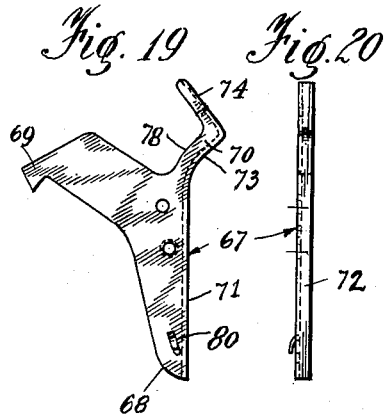
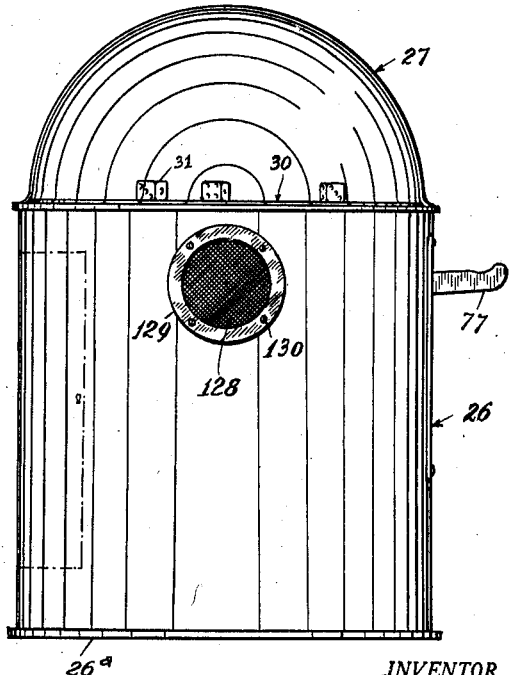

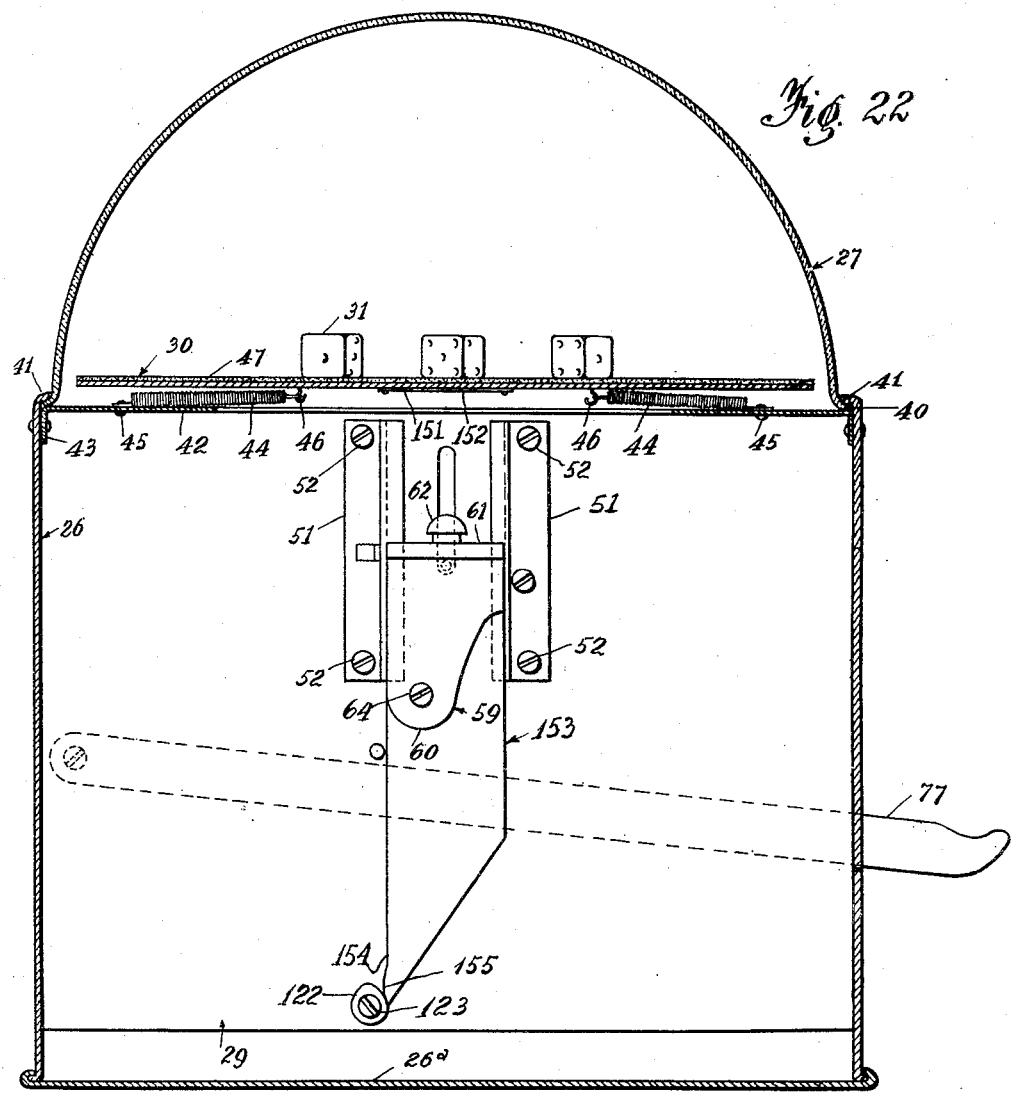
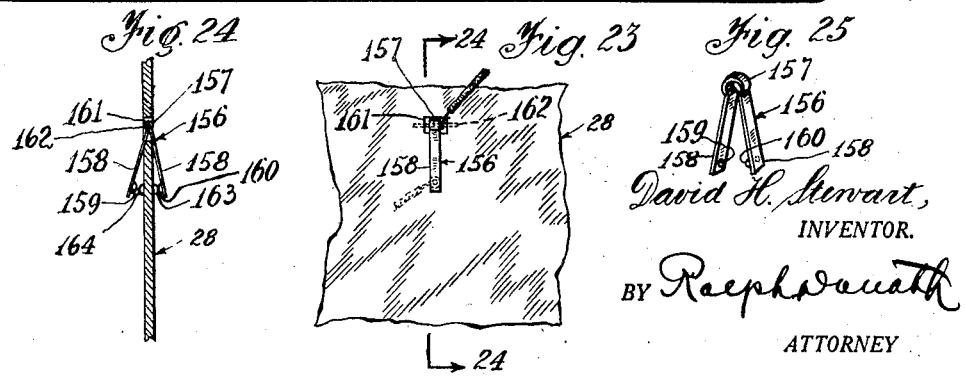

Patented June 28, 1938

2,121,838

UNITED STATES PATENT OFFICE 2,121,838

SOUND OPERATED DICE MACHINE

David H. Stewart, Los Angeles, Calif., assignor to Stanley Johnston, Pittsburgh, Pa.

Application July 1, 1937, Serial No. 151,474

8 Claims. (Cl. 273—145)

This invention relates to games or toys and especially of the type which are sound operated.

One of the objects of this invention is to control from a distant point the operation of the mechanism of a game or toy.

Another object of this invention is to control from a distant point the operation of the mechanism of a game or toy by means of sound waves or other pulsations.

Still another object of this invention is to provide a game or toy which is adapted to control a mechanism which actuates dice, balls or similar objects from a distant point by means of sound waves, or by transmission of speech.

Yet another object of this invention is to provide a dice game or toy which functions by means of a sound operated make and break electric circuit.

Another characteristic of the invention is to provide a sound operated dice game or toy which may be coin controlled and in which the number of throws for a specified coin may be varied without changing the coin-mechanism of the device.

Still another object of the present invention is to provide a sound controlled device including a sound actuated swinging circuit controller therefor, the latter of which being mounted on a diaphragm and adapted to make or break contact on either face of the diaphragm, thus eliminating accurate perpendicular placing of the apparatus, when using.

A further characteristic of the invention resides in the provision in a device of the type set forth which is simple in construction, inexpensive to manufacture and yet one which is exceedingly effective for the purpose for which it is designed.

Other objects of the invention will become apparent as the detailed description thereof proceeds.

In the drawings wherein like numerals of reference designate corresponding parts throughout the several views, Figure 1 is a vertical sectional view through the housing of the device showing some of the vital parts of the mechanism mounted on one side of the division plate, the various parts of the mechanism are shown in a position after a coin has been inserted; as shown this view illustrates the apparatus set to be actuated by inserting a coin for every throw of the dice.

Figure 2 is a fragmentary sectional view through the housing, similar to Figure 1, but showing the parts which are mounted on the opposite side of the division plate.

Figure 3 is a vertical sectional view showing the principal parts of the diaphragm and the electrical circuit controlling member.

Figure 4 is a front elevation of Figure 3 with part of the protecting screen removed to show the electrical circuit controlling member.

Figure 5 is a sectional view along line 5—5 in Figure 4.

Figure 6 is a top view of the device showing in dotted lines the springs which suspend the dice-table.

Figure 7 is a front view of the trigger as used in this invention.

Figure 8 is a side view of Figure 7.

Figure 9 is a front view of the plunger hammer.

Figure 10 is a side view of Figure 9.

Figure 11 is a front view of the coin-retainer.

Figure 12 is a side elevation of Figure 11.

Figure 14 is a diagrammatic detail view of the sound actuated electric circuit including the controlling member therefor.

Figure 15 is a fragmentary assembly view, similar to Figures 1 and 13 showing how the ratchet pawl is being raised out of the engagement of a ratchet-tooth by means of a coin.

Figure 16 is a sectional view along line 16—16 in Figure 2, showing in full lines the resetting lever carrying the armature, and the magnet-coil in an "open" position and in dot and dash lines in a "closed" position.

Figure 17 is a sectional view along lines 17—17 in Figure 2, showing the method of assembly of the resetting lever to the plunger bar and plunger.

Figure 18 is a perspective view of the plunger as used in this invention.

Fig. 19 is a plan view of the combination member.

Figure 20 is a side view of Figure 19.

Figure 21 is an outline view of the complete apparatus.

Figure 22 shows a vertical sectional view through the housing of the device, similar to the one shown in Figure 1, but without a coin device.

Figure 23 is a fragmentary plan view of a modified construction of the electrical circuit controlling means.

Figure 24 is a side view of Figure 23.

Figure 25 is a perspective view of the swinging contact member as used in the modified form shown in Figures 23 and 24.

Figure 1:
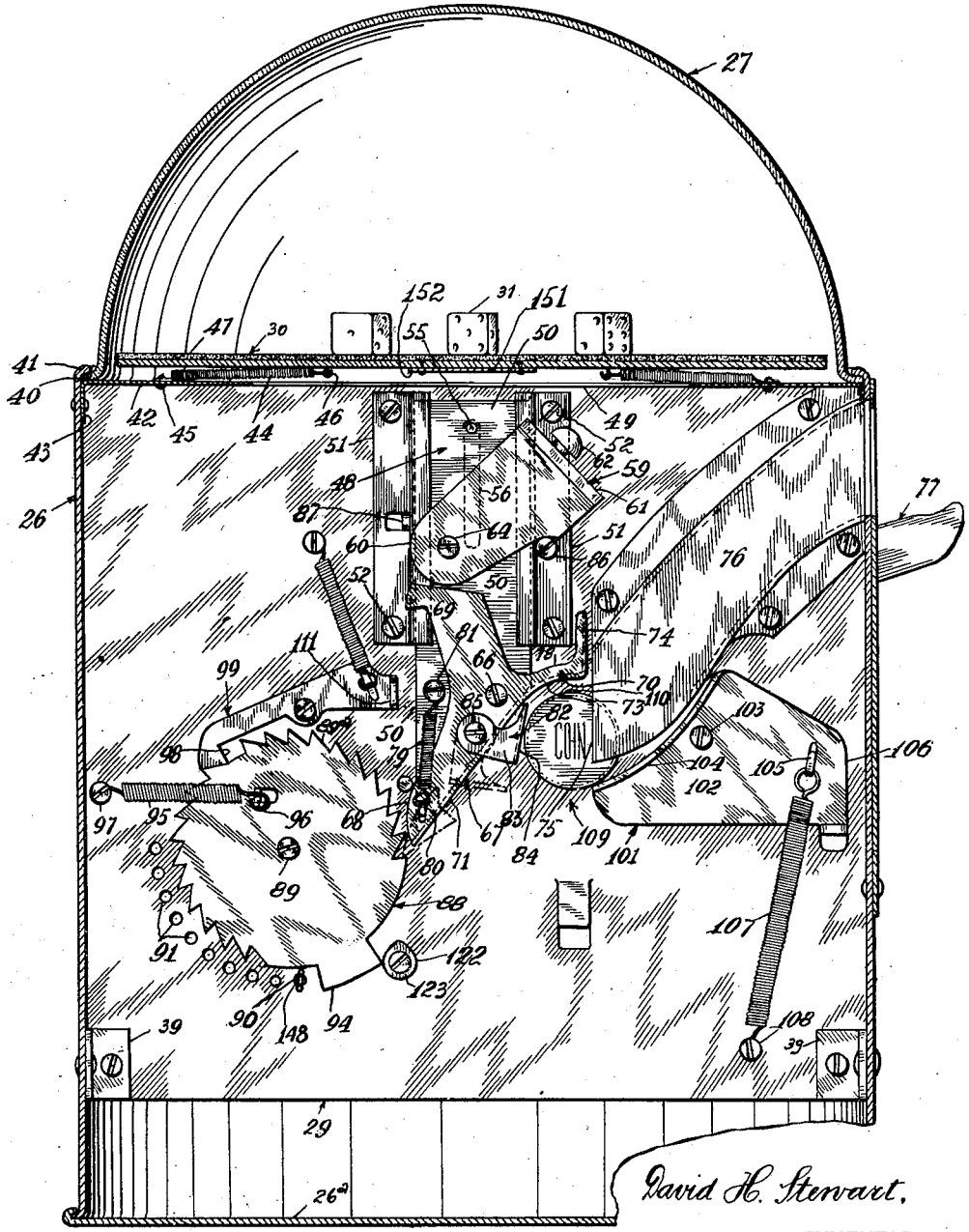

In general, device comprises a housing 26, a glass-dome top 27, a diaphragm 28, a division-plate 29 vertically secured within said housing 26 on which are suitably mounted various mechanisms of the device, a dice-table 30 and a set of dice 31, such as are used in a variety of games of chance and which are made of ivory, bone or other suitable substance.

In addition to the above mentioned elements the device includes an electro-magnet 32 having a core 33 and an armature 34, a battery 35 and an electric circuit controller 36.

Referring to Figures 1 and 6 of the drawings, the device comprises a housing 26 in which is vertically secured the division-plate 29 which divides the interior of said housing 26 into two compartments 37 and 38. This division-plate 29 is securely held in position by means of angle-clips 39 and screws, in a manner as shown, or otherwise.

To simplify the illustration the housing is given a cylindrical shape. The base 26ᵃ may be permanently secured to said housing 26 in any suitable manner. The dome-top 27 is of hemi-spherical contour and made from glass, celluloid or other suitable transparent material, but the same should be assembled so as to permit easy removal of the same in case of accidental breakage or when it is required to have access to the interior of the dome.

To eliminate complications, the said dome-top 27 is shown permanently attached to the housing 26 by providing a flange 40 over which is bent the upper edge 41 of said housing 26. This flange 40 rests on a flat ring 42 which is secured to the interior of the housing by means of a series of downwardly directed lugs 43, or otherwise.

The circular dice table 30 is resiliently supported by means of three or more radially disposed coil-springs 44, one end of the latter being secured to the top of said ring 42 by rivets or screws 45 and the remaining end being secured to the underside of said dice-table 30, preferably, by means of a small hook 46 to facilitate removal of the dice-table, when so desired. The top of the dice-table may be covered with billiard cloth or felt 47, or other suitable material.

With the exception of the diaphragm 28 and its associated elements, the dice actuating mechanism is mounted on the division-plate 29, this feature considerably reduces the cost of production and assembly, it also makes it possible to easily and quickly withdraw the operating mechanism out of the housing, after the dome-top has been removed, whenever so desired.

The embodiment disclosed, shows the operating members including a plunger mechanism 48 assembled centrally and in close proximity of the top edge 49 of the division-plate 29. This plunger mechanism 48 comprises a plunger 50 mounted for sliding movement in a pair of upright Z-shaped plunger-guides 51 fastened to the division-plate 29 by rivets or screws 52.

Figure 18 shows a detailed perspective view of said plunger 50; it is made from flat strip material and is provided with a squared top 53 and a biased lower end 54. Adjacent said top 53 is secured one end of a stud-pin 55 which penetrates and slides in an elongated slot 56 of division-plate 29 and the other end of said stud-pin 55 is secured to the upper portion 57 of a plunger-bar 58, which is located at the opposite side of said division-plate 29 in a manner as shown in Figure 2.

The plunger-hammer 59, detailed in Figures 9 and 10 is also made of flat strip material, rounded at one end 60 and squared and bent-up at the other end 61. This bent-up portion 61 is provided with a shouldered and rounded knob 62 which is secured thereto, as shown. The said plunger-hammer 59 is swingingly attached through aperture 63 by means of a screw 64 which fits into the threaded hole 65 of said plunger 50.

Upon the said plunger 50 and directly below said plunger-hammer 59 is pivotally mounted by means of a pivot-screw 66 the combination ratchet advancer and trigger 67 which is shown detailed in Figures 19 and 20, comprises a cam or pawl-portion 68, a trigger-portion 69 and a coin-releasing portion 70. To limit the movement of said combination member 67, while in relaxed position (Figures 1 and 13), the pawl-portion 68 is biased as indicated by the numeral 71 at an angle, similar to the biased lower end 54 of said plunger 50 and is bent downwardly as indicated by the numeral 72 in Figures 19 and 20.

The coin-releasing portion 70 of said combination member 67 is provided with a rounded extension 73 which is a continuation of said biased portion 71 and it terminates in an upwardly extended lug 74. This lug 74 serves to partially close the lower open end 75 of the coin-chute 76 while the resetting-lever 77 is in "down" position (see Figure 13). Now, supposing someone inserts a coin by error while the lever 77 is in "down" position, the coin will be retained within the coin-shute 76 until the lever is again in "up" position, otherwise, should this lug be eliminated it is possible that the coin rolls over the outer edge 78 of said rounded extension 73 of combination member 67 thus rendering the device inoperative.

A coil-spring 79, one end of which being hooked over the struck-out hook 80 and the other end of which being held by a screw 81 secured on plunger 50 serves to normally retain the combination member 67 in a position as shown, for instance, in Figure 1.

82 indicates a coin-sizer comprising the flat portion 83, the bent-down portion 84 and the adjusting screw 85 by means of which the coin-sizer may be adjusted to permit passing of coins of different size. Figure 1 shows in full lines the coin-sizer 82 adjusted for coins of the size of a cent, but it will also operate with coins of the size of a nickel, whereas the dot and dash lines indicate the position of the coin-sizer when the device is set for operation of nickels only. In the latter case, a penny will not operate the machine, it will drop into the coin-box without having effect on the mechanism.

It will be noted that the plunger-hammer 59, when in idling position (Figure 1) rests in an inclined position on a stop or guide-screw 86, but when in strained position (Figure 13), the same screw 86 serves as a guide for one of the edges of the plunger-hammer 59 and the struck-out lug 87 serves as a guide for the other edge of the plunger-hammer. In that position, the plunger-hammer is, during silence, in striking condition.

88 indicates a mutilated ratchet-wheel which is rotatably mounted on the division-plate 29 by means of a pin-screw 89 in which the pawl portion 68 of the combination member 67 transmits an intermittent circular motion to said ratchet-wheel 88 for a distance of one tooth 89ᵃ, every time the resetting lever 77 is manually pulled downwardly for action, until the desired number of permissible strokes is reached and is checked by stop-pin 90 which may be inserted in one of the concentrically and equally spaced apertures 91.

The ratchet-wheel 88 is provided with two sets of teeth 92 and 93, each set having ten teeth (more or less if so desired) and a stop-lug 94 extends outwardly and beyond the outside diameter of the ratchet-wheel which serves as a limit stop. A coil spring 95, one end of which is secured to the struckout portion 96 of ratchet wheel 88 and the other end of which is suitably attached to the division-plate 29 by a screw 97, or otherwise.

As the ratchet wheel 88 revolves the distance of one tooth each time the resetting-lever is pulled downwardly as heretofore stated the toothed end 98 of the spring-tensioned tripper 99 engages one of the teeth 100, thereby retaining the spring-tensioned ratchet-wheel 88 at rest until the resetting-lever is again moved downwardly. Whenever the stop-lug 94 reaches the stop-pin 90, the device is rendered inoperable and it is again necessary to insert another coin.

Figure 1 shows the arrangements of the mechanism after a coin has been inserted, the coin is held between a coin-sizer 82 and the coin-retainer 101, the latter of which comprising a substantially flat member 102, pivotally assembled on a pin-screw or pivot-pin 103 and one of the edges of said member 102 has an arcuate and upturned edge 104. A struck-out hook 105 is provided adjacent the outer edge 106 of said member 102 which is adapted to retain one end of a coil-spring 107, the remaining end of said spring is attached to the division-plate 29 by a screw 108, or otherwise.

As will be seen in Figure 1, the coin cannot pass between the gap 109 until the resetting-lever 77 is manually pulled downwardly. After this has been accomplished, the plunger assembly carrying the combination member 67 is also moved downwardly, the upper edge 110 of the coin is then brought in contact with the coin-releasing portion 70 of said combination member 67, thereby moving the latter towards the upturned lug 111 of said tripper 99. As the plunger mechanism is moved downwardly the trigger portion 69 of combination member 67 comes in engagement with said upturned lug 111 of said tripper 99 which in turn causes the toothed end 98 of the latter to be lifted out of engagement of one of the teeth of the ratchet wheel 88 which causes the latter, due to its tensioned mounting, to return to its normal position.

Referring now to Figures 2, 16 and 17 of the drawings, there are shown the various members mounted on the opposite side of the division-plate 29. The resetting-lever 77 is pivotally mounted on said division-plate 29 by means of a pin-screw 112. The free end 113 of said lever 77 penetrates through a vertically disposed slot 114 of the housing 26.

Approximately midways of said resetting-lever 77 is pivotally attached thereto the lower end 115 of plunger-bar 58 by a pivot-screw 116. This lower end 115 is bent outwardly to freely accommodate the said lever 77 and the upper end 117 of said plunger-bar 58 is secured by stud-pin 55, which penetrates through the division-plate 29 and which is secured to the plunger 50, as previously described.

32 indicates a magnet-coil, having a core 33 which is secured to an angular support 118. This angle may be attached to the division-plate 29 by screws 119 or otherwise. The armature 34, in this case, in the shape of an angle, is permanently fastened to the resetting-lever 77 in alignment with said core 33. In relaxed position the said lever 77 is being urged against a limiting-stop 120 by a coil-spring 121, as shown.

As shown in Figure 2 in dot and dash lines, the armature 34 is held by the electro-magnet 32. In this condition the electric circuit is closed so that current flows and the magnet is energized. The pull of the magnet upon the armature is opposed by spring 121, as heretofore described, but insufficient of overcoming the magnetic pull of the electro-magnet. In order to release part of the pull of the electro-magnet when in contact with the armature 34, a cam 122 is provided which may be adjusted by a screw 123 so as to create a slight friction with the edge 124 of the pawl-portion 68 of the combination member 67 (see Figure 13).

Figures 3, 4 and 5 illustrate the elements by means of which ordinary sound-waves generally available, such as calling, hand-clapping, whistling etc., interrupt a closed electric circuit to facilitate operation of various actuating mechanisms, such as previously described.

In the present invention, the principal elements to interrupt the closed electric circuits by sound-waves include a diaphragm 28, opposed by a swinging contact member 125, in which gravity is relied upon to create a light contact pressure between said diaphragm 28 and said swinging contact member 125. The aforesaid interrupting elements are accessibly mounted on the interior front-wall 126 of the housing 26. As best shown in Figures 3 and 4 the front of said housing 26 is provided with a circular opening 127 which is covered by a fine meshed screen 128 and held in place by a ring 129 and screws 130. This screen serves mainly to prevent unauthorized tampering with swinging member 125.

In this arrangement, the diaphragm 28 is shown mounted on a metallic support 131 (Figure 5), the latter of which is fastened to the inner wall 126 of said housing 26 by means of rivets, or otherwise.

As shown, said diaphragm 28 is of the apron type, that is, it is supported only at the top, but it is to be understood, that the same may be mounted at the bottom, sideways, or it may be fully supported.

As shown, the diaphragm is made of fibre, plywood or other non-conductive material, but of course any suitable sheet material may be used, if so desired. The first mentioned materials have been selected in this design for convenience to use the metallic housing as a ground in the electric circuit.

The swinging contact member 125, which opposes the diaphragm 28, is accessibly suspended at the exterior upper face of the diaphragm 28 on a pair of hooks 132. This contact member 125 may be made from sheet material, preferably of triangular contour, as shown, and the same is provided at the top with a pair of horizontally aligned apertures 133 adapted to swingingly engage said hooks 132. The pointed lower end 134 of said swing contact member 125 is provided with a contact-point 135 of suitable material, which comes in contact and opposes another contact-point 136 secured to the diaphragm 28. A contact-bridge 137 or wires may be used to electrically ground the housing 26 with the hooks 132, as shown (Figures 3 and 4).

Figure 14 shows diagrammatically the electric controlling mechanisms and connections of the device and assuming, that the armature is adhering to the core of the electro-magnet as shown in full lines, and also assuming that the housing 26 be made of metal thus serving as a "ground", the electric circuit may be as follows:

From terminal 138 of battery 35 by wire 140 to diaphragm contact-point 136 to contact-point 135 of the swinging member 125 to hooks 132, contact bridge 137 to ground 141. The other terminal 142 of said battery 35 connects by wire 143 one end 144 of magnet-coil 32, the other end 145 of said coil 32 connects by wire 146 to ground 147. Of course, in this condition, the circuit is closed so that current flows and the armature 34 adheres to core 33 of coil 32, and the apparatus is now responsive to ordinary sound-waves, such as calling, hand-clapping etc.

Figure 1 shows the apparatus with an adjustment in which it is required to insert a proper coin for every throw of the dice. This is accomplished by placing the stop-pin 90 in the first of the concentrically disposed holes 148 of holes 91 from the right, as shown, which thus limits the circular movement of the ratchet-wheel 88 by stop-lug 94, until another coin is inserted.

Figure 13:
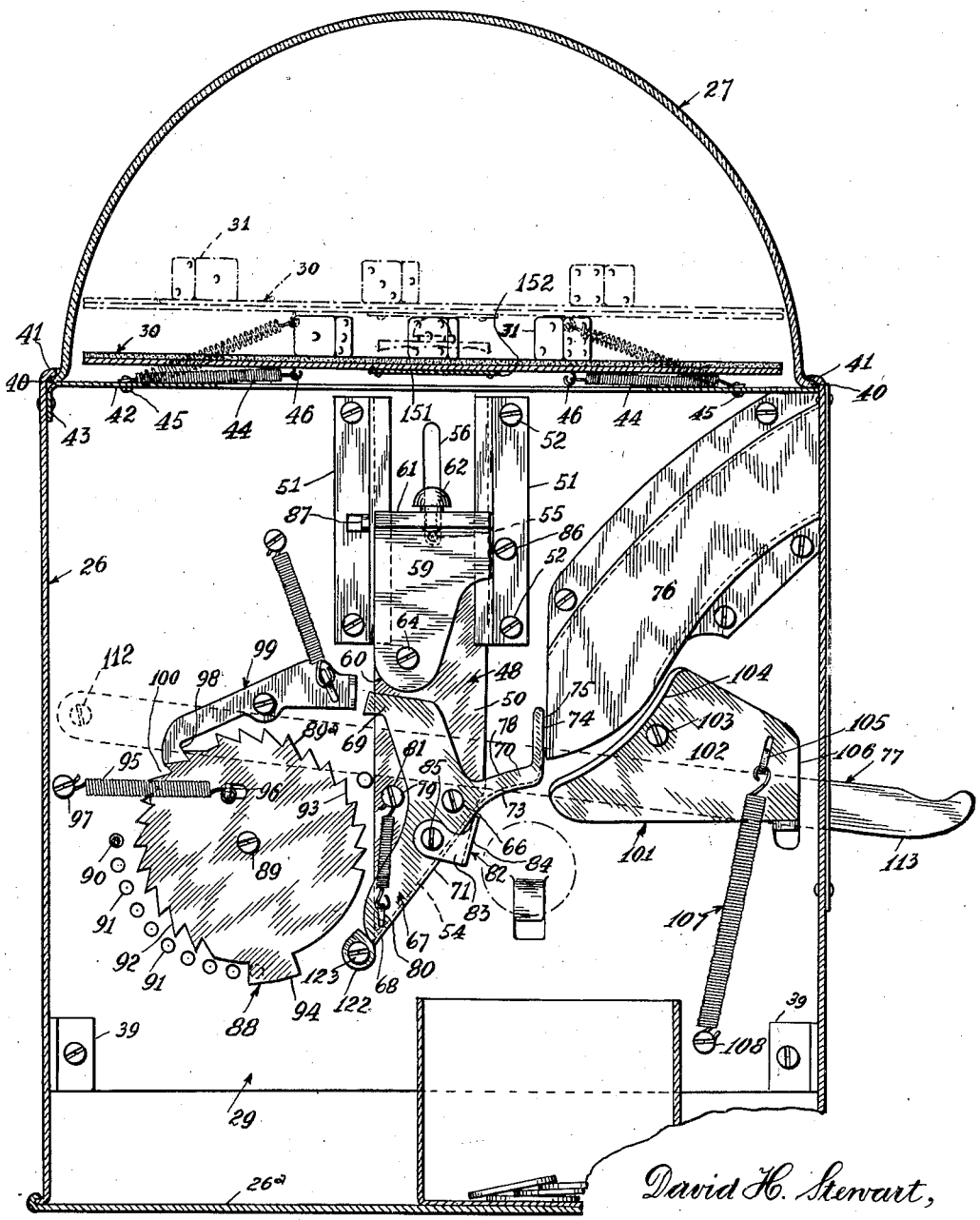
Figure 13 is a view similar to Figure 1 showing the plunger mechanism which actuates the dice table and other associated mechanisms in position ready for action, there is also shown in dot and dash lines the momentary extreme "up" position of the dice table within the glass dome.

Now, assuming, that the proper coin has been inserted and the same is held in position as shown in Figure 1, the operator manually thrusts the resetting lever 77 downwardly causing the armature 34, which is mounted on said lever 77 to contact the core 33 of magnet 32 (Figure 14), thereby closing the electric circuit which in turn causes the current to flow through the electromagnet, which attracts the armature now energized by the circuit which causes the armature to adhere to the magnet. The various elements assume new positions as shown in Figure 13 with exception of pin 90 which is shown in tenth hole for ten throws of the dice for a single coin.

The apparatus is now set for operation and upon producing a proper sound, the vibration of diaphragm 28 will cause the swinging member 125 to be thrown off which opens the opposing contact points 135 and 136, thus the electric circuit is interrupted and since no current flows through the armature 34, the resetting lever 77, including the armature 34, due to spring 121 returns to inactive position as shown in Figure 14 in dot and dash lines.

Of course, it is obvious, that the pull of the magnet upon the armature opposed by said spring 121, is under strain, but incapable of overcoming the normal electric pull of the magnet when the circuit is closed.

After a sound action, the contact between the contact-point of diaphragm 28 and the contact-point 136 of the swinging member 125 is almost immediately restored by gravity, but the closing of the circuit by the armature 34 and the magnet 32 is effected by the downwardly pulling of the resetting-lever 77 upon which the armature is secured. It will be noted, that, while the resetting lever 77 is in "up" position, the circuit is interrupted, thus eliminating a wasteful flow of current from the battery.

In addition to aforesaid operation of the device, attention is again directed to Figure 13 of the drawings which shows the device set for action and adjusted for ten throws of the dice, that is, the stop-pin 90 is in the tenth hole, indicated by the numeral 150, of the cocentrically spaced holes 91.

As a sound is uttered, the resetting-lever 77 abruptly returns, by means of spring 121 to "up" or inactive position, and since the plunger mechanism 48 moves with lever 77, the knob 62 of plunger-hammer 59 violently strikes the underside 151 of the resiliently mounted dice-table 30 causing the latter to be momently raised to a position shown in dot and dash lines and, at the same time considerably disturbing the dice placed thereon. Normally and inactive the dice-table 30 rests on the coil-springs 44, as shown in full lines in Figures 1 and 13.

To protect the portion of the underside of the dice-table on which the knob 62 of hammer 59 strikes the same, provision is made in the form of a strike-disc 152 which is riveted to the underside of the table in alignment with the knob 62 of hammer 59 when in striking position.

Extensive experiments have shown, that, if the plunger would be used to strike the dice-table 30, the head of the plunger which faces the underside of the dice-table would have to be extended so as to come in close proximity of the table; in that case it would be possible, by continuous shaking of the resetting lever 77, to disturb the dice on the table without the insertion of a coin.

This disadvantage is entirely eliminated by using a striking mechanism which comprises two parts, the plunger 50 and the plunger-hammer 59. Figure 1 shows the latter in a relaxed position, that is, the same is tilted and rests on guide screw 85, as shown. Figure 3 shows the plunger-hammer 59 in striking position and guided by guide screw 86 and the struck-out lug 87.

When a sound is uttered, the plunger-hammer abruptly strikes the underside of said dice-table and again returns to the tilted position as shown in Figure 1.

A modified embodiment of the device is illustrated in Figure 22. In this arrangement, intended for home use, the coin-device and the mechanism which restrict the number of permissible tosses of the dice for a single coin, have been eliminated.

This device comprises the housing 26, the dome-top 27, the diaphragm 28, the division-plate 29, the dice table 30, cubes or dice 31, the electro-magnet 32, its core 33, the armature 34, the battery 35, the circuit making and breaking member 36, the plunger 153, the plunger-hammer 59 and the resetting-lever 77. All the above mentioned elements as well as the electric circuit are substantially identical with the previously described coin-operated device.

To set the apparatus for action, the resetting lever is thrust downwardly, to a position as shown in Figure 22, so as to cause the armature 34 to contact the core 33. The plunger 153 and the plunger-hammer 59 then assumes a position shown in said Figure 22.

It will be noted, that the plunger 153 is of the same construction as the plunger 50 for coin-operated devices, with the exception that it is provided at its lower edge 154 with a cam-like extension 155, as shown, which serves a similar purpose as the cam-portion 63 of the combination member 67, that is, to create a slight friction with cam 122, thus partly relieving the tension of the coil-spring 121 of the resetting-lever 77, when the latter is in "down" position.

Upon the utterance of a sound, adequate to vibrate the diaphragm 28, the swinging circuit making and breaking member 36 breaks the electric circuit, thus permitting the electro-magnet 32 to release the armature 34 and the resetting-lever 77 abruptly returns, by means of spring 121, to "up" position and since the plunger 153 is secured to the plunger-bar 58 and the latter to said lever 77, the plunger-hammer 59 violently strikes the underside of the dice-table 30 which in turn disturbs the dice 31 resting thereon.

Figures 23 to 25 inclusive, show a modified embodiment of the swinging contact member 156 as used in the device.

This modification is intended to be used to a great advantage, for instance, when there is a possibility that the device is placed on a table or platform which is not perpendicular. With this modified swinging member 156 the apparatus may be tilted either way and yet be always in contact with one of the double contacts 164 or 163 on the diaphragm 28, as will be understood.

The modified form of the swinging member comprises an inverted V shaped element, bent flatwise and preferably made from thin strip material such as copper etc., having a rounded apex 157 and a pair of spread apart legs 158. Each of said legs being provided at its lower end with an opposing contact point 159 and 160, as shown.

The embodiment disclosed in Figures 23 and 24 show the acoustically vibratable diaphragm 28 provided with an aperture 161 in which a horizontally disposed pin 162 is secured in a manner as shown, or otherwise. Upon said pin 162 is swingingly suspended the swinging contact-member 156 arranged to contact with either one of the double contacts 163 and 164 attached to the diaphragm 28.

The electrical connections in the arrangement are the same as the one heretofore described for the coin-operated device (Figure 14).

From the foregoing description taken in connection with the accompanying drawings, the construction of the devices and the method of operation will be readily apparent to those skilled in the art to which this invention appertains, and while describing the principle of operation together with the devices which are now considered to be the best embodiment thereof, it is to be understood that various changes in the form, proportion and the minor details of construction may be resorted to without departing from the principle or sacrificing any of the advantages of the invention as defined in the appended claims.

I claim:

1. In a dice playing device, a dice-table, a plurality of dice freely positioned thereon, means to resiliently support said dice-table and sound actuated means to jar said dice-table.

2. In a dice playing device, a dice-table, a plurality of dice freely positioned thereon, resilient means to support said dice table in a floating position; striking means arranged to strike said dice-table, a resetting lever effective on said striking means, electro-magnetic means to hold said resetting lever in active position, means to return said resetting lever into inactive position and sound actuated means to de-energize said electro-magnetic means.

3. In a dice playing device, a dice-table, a plurality of dice freely positioned thereon, resilient means to floatingly support said dice-table, striking means arranged to strike said dice-table, a plunger supporting said striking means, guides for said plunger, a resetting lever arranged to reciprocate said plunger, electro-magnetic means adapted to hold said resetting lever and plunger into active position, means to return said resetting lever into inactive position and sound actuated means effective on said electro-magnetic means to release said resetting lever and strike means into striking position.

4. In a dice playing device, a dice-table, a plurality of dice freely positioned thereon; spring means to floatingly support said dice-table; a resetting lever; a plunger hingedly secured thereto, means to guide said plunger for reciprocal movement, a hammer hingedly mounted on said plunger and adapted to strike said dice-table; spring means to bring said resetting lever into ineffective position; electro-magnetic means to counteract said spring means and hold said lever into effective position, and sound actuated means effective on said electro-magnetic means to release said lever and plunger to cause said hammer to strike said dice-table.

5. In a dice playing device, a dice-table, a plurality of dice freely positioned thereon; spring means to floatingly support said dice-table; a resetting lever; a plunger hingedly secured thereto, means to guide said plunger for reciprocal movement, a hammer hingedly mounted on said plunger and adapted to strike said dice-table; spring means to bring said resetting lever into ineffective position; electro-magnetic means to counteract said spring means and hold said lever into effective position, an electrical battery to energize said electro-magnetic means; normally closed electric connections for said electro-magnetic means and battery, and sound actuated means to open said connections and release said resetting lever and hammer to cause said hammer to strike said dice-table.

6. In a dice playing device, a dice-table, a plurality of dice freely positioned thereon; spring means to floatingly support said dice-table; a resetting lever; a plunger hingedly secured thereto, means to guide said plunger for reciprocal movement, a hammer hingedly mounted on said plunger and adapted to strike said dice-table; spring means to bring said resetting lever into ineffective position; electro-magnetic means to counteract said spring means and hold said lever into effective position; a diaphragm susceptible to sound vibrations; an electric battery to energize said electro-magnetic means; normally closed electric wiring connections for said electro-magnet and battery, and means positioned on said diaphragm to open said connections when subjecting the diaphragm to sound waves whereby said lever and hammer are released to cause said hammer to strike said dice-table.

7. In a dice playing device, a housing having a transparent dome-top, a dice-table, a plurality of dice freely positioned thereon, resilient means to floatingly support said dice-table; a resetting lever; a plunger hingedly secured thereto, means to vertically guide said plunger for reciprocal movement, a hammer hingedly mounted on said plunger and adapted to strike said dice-table; spring means to bring said resetting lever into effective position; electro-magnetic means to counteract said spring means and hold said lever into effective position, sound actuated means effective on said electro-magnetic means to release said lever, plunger and hammer to cause said hammer to strike said dice-table and means to tilt said hammer out of reach of said dice-table while said resetting lever is in ineffective position.

8. In a dice playing device, a housing having a transparent dome-top, a dice-table, a plurality of dice freely positioned thereon, resilient means to floatingly support said dice-table; a resetting lever; a plunger hingedly secured thereto, means to vertically guide said plunger for reciprocal movement, a hammer hingedly mounted on said plunger and adapted to strike said dice-table; spring means to bring said resetting lever into effective position; electro-magnetic means to counteract said spring means and hold said lever into effective position, sound actuated means effective on said electro-magnetic means to release said lever, plunger and hammer to strike said dice-table, means to tilt said hammer out of reach of said dice-table while said resetting lever is in ineffective position and means to place said hammer in striking position when said resetting lever is in effective position.

DAVID H. STEWART.